R. W. KIDSTON.
BAGGAGE TRUCK.
APPLICATION FILED MAR. 8, 1911.
1,024,342.
Patented Apr. 23, 1912.
2 SHEETS—SHEET 2.
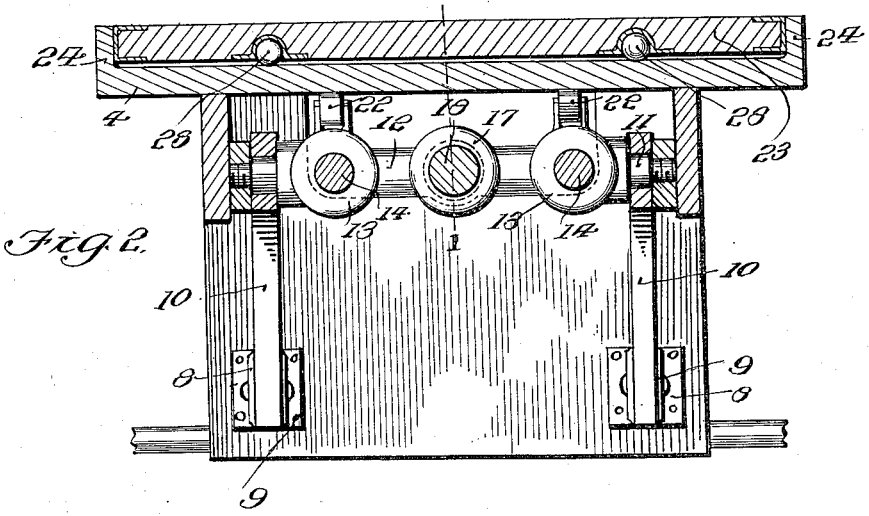
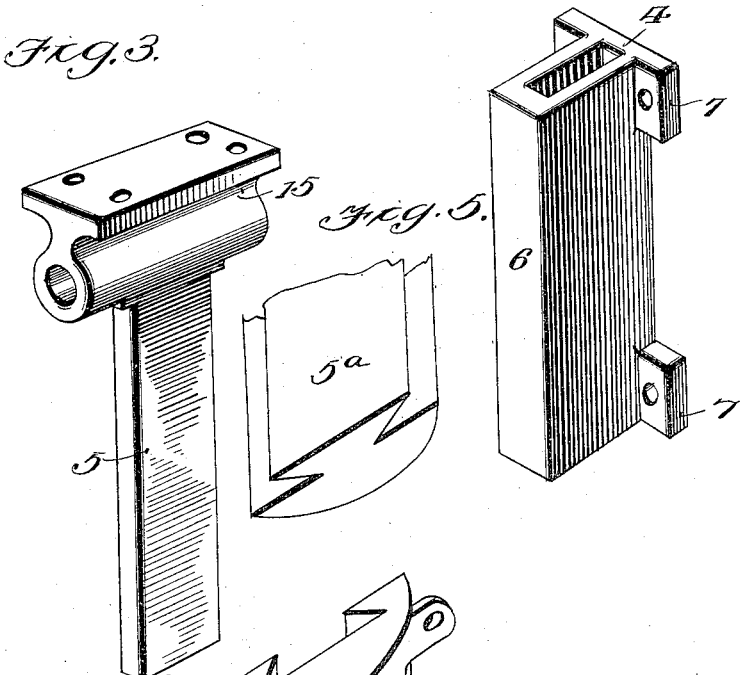
Witnesses
W. H. Woodson
Juana M. Fallin
Inventor
R. W. Kidston.
By H. H. Wallace, Attorneys.

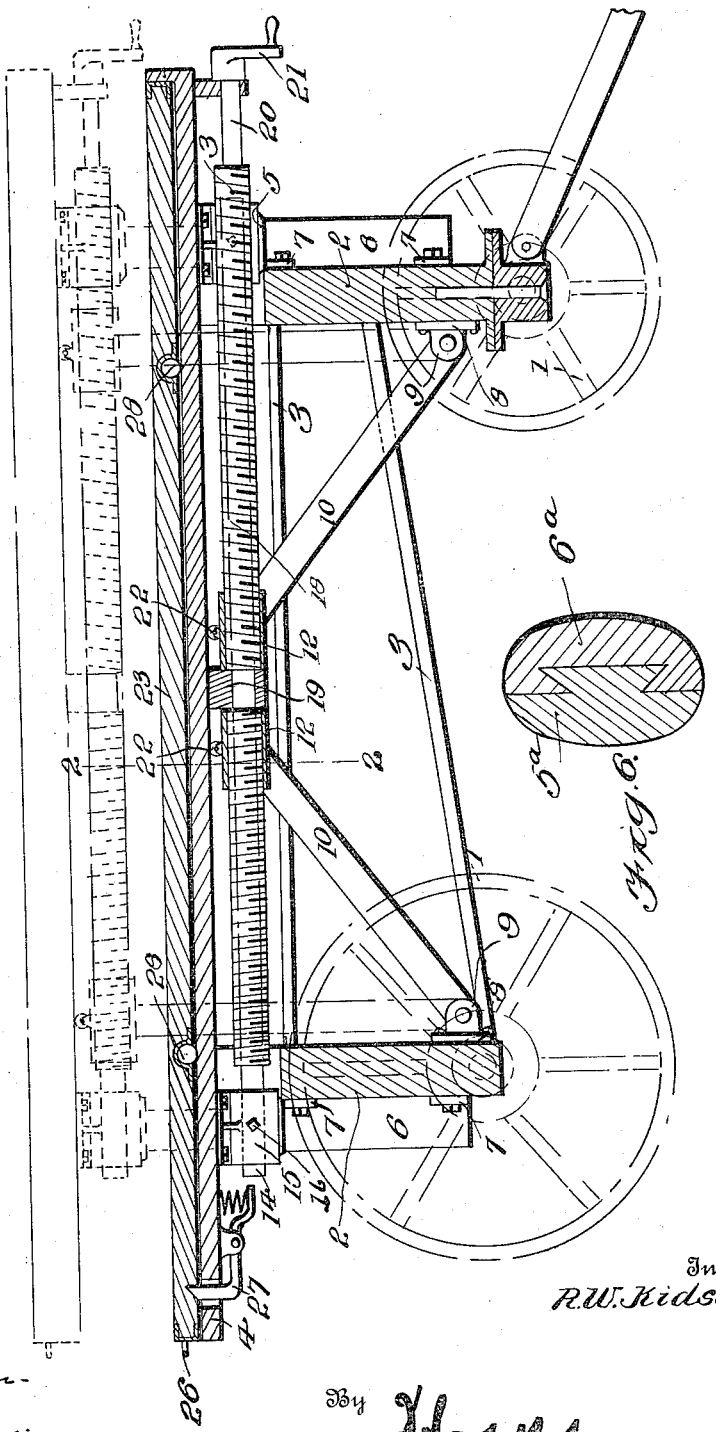

UNITED STATES PATENT OFFICE.

ROBERT W. KIDSTON, OF YOUNGSTOWN, OHIO.

BAGGAGE-TRUCK.

1,024,342.  Specification of Letters Patent. Patented Apr. 23, 1912.

Application filed March 8, 1911. Serial No. 613,083.

*To all whom it may concern:*

Be it known that I, ROBERT W. KIDSTON, a citizen of the United States, residing at Youngstown, in the county of Mahoning and State of Ohio, have invented certain new and useful Improvements in Baggage-Trucks, of which the following is a specification.

This invention comprehends certain new and useful improvements in trucks for handling baggage and the invention has for its primary object an improved baggage truck which will be simple and practical to construct, efficient in operation to raise the load to the required elevation and which will be durable and not involve unnecessary wear on the parts as the bed or floor of the truck is raised and lowered.

With these and other objects in view as will more fully appear as the description proceeds, the invention consists in certain constructions, arrangements and combinations of the parts that I shall hereinafter fully describe and claim.

For a full understanding of the invention, reference is to be had to the following description and accompanying drawings, in which:

Figure 1 is a longitudinal sectional view of a baggage truck constructed in accordance with my invention, the section being taken substantially on the line 1—1 of Fig. 2; Fig. 2 is a transverse sectional view thereof on the line 2—2 of Fig. 1, the tie-rods 3—3 hereinafter referred to being omitted; Figs. 3 and 4 are detail perspective views of guide bars and sleeves therefor; Figs. 5 and 5ª are fragmentary perspective views of modified forms of guide bars and their coacting parts; and, Fig. 6 is a transverse sectional view through such parts in operative relation to each other.

Corresponding and like parts are referred to in the following description and indicated in all the views of the drawings by the same reference characters.

My improved baggage truck embodies traveling wheels 1 which support a framework including front and rear vertically disposed and transversely extending frame members 2 braced by tie rods 3. It also embodies a bed or floor 4 with means for raising and lowering the floor.

The floor 4 has secured to it near its corners, depending and vertically disposed guide bars 5 which are preferably oblong in cross section, as shown and which are secured at their upper ends by lag screws or similar fastening devices. These guide bars 5 are mounted for vertical movement in vertically elongated sleeves 6 which are preferably formed at the top and bottom with laterally extending ears 7 through which bolts or similar fastening devices extend so as to secure the sleeves to the frame members 2.

8 designates bearing members which are bolted or otherwise secured to the front and rear frame members 2 near the lower ends of the latter, as shown, said bearing members embodying respectively, spaced and transversely apertured ears 9 between which the lower ends of the two pairs of links 10 are pivotally connected. The links of the respective pairs are designed to extend upwardly and toward each other as shown, the upper ends of the links being held by nuts on the reduced ends 11 of transversely extending yokes 12. Each of the two yokes 12 is formed at its ends with bearings 13 through which guide shafts 14 extend. The shafts 14 are held at their ends in tubular bosses 15 which form part of the guide bars 5, the shafts being secured in the bosses by set screws 16, as shown. In addition to the bearings 13, the yokes 12 are formed at their middle points with longitudinally alined bearing members 17 that are interiorly screw threaded to engage the right and left hand portions of a screw threaded actuating rod 18, said rod being held as against longitudinal movement by being formed with a middle smooth portion engaged by a fork 19 secured to and depending from the lower face of the floor 4. The actuating rod 18 is formed at one end with an extension 20 on which a crank handle 21 is designed to be detachably mounted, so that by turning the handle in one direction or the other, the yokes 12 may be moved away from each other or closer together, so as to raise or lower the floor 4, the floor being guided in its up and down movement by the bars 5 working in the vertical sleeves 6. Preferably, in order to reduce friction between the yokes 12 and the floor 4, anti-friction rollers 22 are journaled between ears formed on the upper sides of the bearings 13.

In connection with the floor or bed 4 of the truck, I may employ a platform 23 which is mounted to slide on the upper face of the floor 4 and is designed to rest loosely thereon, so that the load of baggage supported directly on the platform 23 may be lifted and deposited at any place desired, or may be transferred into or from a car, or the like, by rolling the platform off or on the truck. For instance, in the operation of transferring baggage, two trucks may be backed up to the side opening doorway of a baggage car, one truck empty and the other loaded, and the transfer of baggage may be quickly made by merely rolling the platform of the loaded truck into the car and rolling a loaded platform from the car onto the empty truck. The platform 23 is guided on to and off of the floor of the truck between side rails or flanges 24 secured to the side edges of the floor, the movement of the platform being limited in one direction by an end stop 25 and the movement in the opposite direction being facilitated by means of a grab iron 26 secured to one edge of the platform. In order to hold the platform in place and prevent any accidental displacement, I provide a latch 27 which is secured to the lower face of the bed or floor 4 and which is designed to spring up through an opening formed in the floor into engagement with a socket or other keeper formed in the lower face of the platform.

28 designates anti-friction balls which are mounted in the lower face of the platform 23 so as to roll on the floor of the truck and facilitate the movement of the platform.

From the foregoing description in connection with the accompanying drawings, the operation of my improved baggage truck will be apparent. In the practical use of the device, in order to raise the platform 23 to the desired elevation, the operator will grasp the crank handle 21 and turn the actuating rod 18 in a direction to move the toggle yokes 12 away from each other, the toggle links 10 thereupon effecting the raising of the platform and the upward movement of the latter with the floor 4 being guided by means of the bars 5 in the vertically disposed guide sleeves 6. In order to lower the floor and the platform carried thereby, it is obviously only necessary to turn the actuating rod 18 in the opposite direction. As the threaded actuating rod 18 is horizontally disposed, it is manifest that the parts will remain in adjusted position without the necessity of providing latches or similar accessories for this purpose, and as the guide bars 5 and openings in the sleeves 6 are smooth, no wear will be imposed thereon, such as there would be if the floor were to be raised and lowered by means of vertically disposed screws.

It is to be understood that any construction of steering gear or devices may be used with my improved baggage truck. It is also to be understood that, as indicated in Figs. 5, and 6, the guide bars and their sleeves may have a dove-tailed engagement with each other, as indicated at $5^a$ and $6^a$.

Having thus described the invention, what is claimed as new is:

A baggage truck of the character described, comprising a wheel supported framework, including transversely extending frame members, vertically disposed guides secured to said frame members at the front and rear of the framework, respectively, guide bars mounted for a vertical sliding movement in said guides and provided at their upper ends with horizontally disposed longitudinally extending hollow bosses, a floor to which the upper ends of said guide bars are fastened, the guide bars being arranged in pairs, the members of each pair being laterally spaced from each other, links pivotally connected at their lower ends to the framework, yokes to which the upper ends of said links are pivotally connected, the yokes being formed with two end bearings and an intermediate bearing, respectively, guide rods passing through said end bearings and secured at their ends in the said bosses, an actuating rod having right and left-hand screw threaded portions working in the intermediate bearings of the respective yokes, and a rotary connection between said actuating rod and the floor.

In testimony whereof, I affix my signature in presence of two witnesses.

ROBERT W. KIDSTON. [L. S.]

Witnesses:
H. A. ERNST,
FRED SCHELLER.